United States Patent [19]
Moehnke et al.

[11] Patent Number: 5,966,849
[45] Date of Patent: Oct. 19, 1999

[54] LOCK SYSTEM FOR EXCAVATING TOOTH POINT AND ADAPTER AND FOR RIGGING

[75] Inventors: Michael D. Moehnke, Forest Grove; Bruce C. Johnson, Portland, both of Oreg.

[73] Assignee: Columbia Steel Casting Co., Inc., Portland, Oreg.

[21] Appl. No.: 09/074,554

[22] Filed: May 7, 1998

Related U.S. Application Data

[63] Continuation-in-part of application No. 08/965,743, Nov. 7, 1997.

[51] Int. Cl.⁶ ................................................. E02F 9/28
[52] U.S. Cl. ............................... 37/457; 37/453; 172/719
[58] Field of Search .......................... 37/450, 452, 453, 37/455, 456, 457, 459, 460, 446; 172/701.2, 701.3, 719

[56] References Cited

U.S. PATENT DOCUMENTS

| | | | |
|---|---|---|---|
| 1,808,311 | 6/1931 | Madonna . | |
| 1,834,514 | 12/1931 | Brune . | |
| 1,874,783 | 8/1932 | Mekeel . | |
| 2,688,475 | 9/1954 | Small ............................................ | 262/8 |
| 2,846,790 | 8/1958 | Davis et al. ................................ | 37/142 |
| 3,197,894 | 8/1965 | Ratkowski .................................. | 37/142 |
| 3,358,569 | 12/1967 | Averette ....................................... | 94/50 |
| 3,601,911 | 8/1971 | Wood ...................................... | 37/142 R |
| 3,650,053 | 3/1972 | Baer ........................................... | 37/142 |
| 3,722,932 | 3/1973 | Dougall ................................ | 287/103 D |
| 3,733,722 | 5/1973 | Launder .................................. | 37/142 A |
| 3,792,735 | 2/1974 | Radigan ...................................... | 172/753 |
| 3,864,853 | 2/1975 | Klett et al. ............................... | 37/141 T |
| 3,952,433 | 4/1976 | Heinold et al. .......................... | 37/142 A |
| 4,326,348 | 4/1982 | Emrich ..................................... | 37/142 R |
| 4,338,736 | 7/1982 | Radigan ................................... | 37/142 A |
| 4,716,668 | 1/1988 | Hahn ........................................ | 37/142 A |
| 4,727,663 | 3/1988 | Hahn ........................................ | 37/142 A |
| 4,823,486 | 4/1989 | Diekevers et al. ........................ | 37/142 R |
| 4,848,013 | 7/1989 | Bowman et al. ......................... | 37/142 A |
| 4,918,843 | 4/1990 | Kiesewetter et al. .................... | 37/142 A |
| 5,009,017 | 4/1991 | Diekevers et al. ....................... | 37/142 A |
| 5,068,986 | 12/1991 | Jones ........................................ | 37/142 A |
| 5,172,500 | 12/1992 | Renski et al. ............................ | 37/142 A |
| 5,205,057 | 4/1993 | Garman ..................................... | 37/458 |
| 5,337,495 | 8/1994 | Pippins ...................................... | 37/453 |
| 5,561,925 | 10/1996 | Livesay ..................................... | 37/455 |

FOREIGN PATENT DOCUMENTS

| | | | |
|---|---|---|---|
| 641404 | 5/1962 | Canada ...................................... | 37/112 |
| 729862 | 3/1966 | Canada ...................................... | 37/112 |
| 565417 | 11/1944 | United Kingdom ....................... | 37/142 |

*Primary Examiner*—Robert E. Pezzuto
*Attorney, Agent, or Firm*—Klarquist Sparkman Campbell Leigh & Whinston, LLP

[57] ABSTRACT

A lock system removably connects an earth-engaging tooth point to an adapter. The lock system is particularly suited to tooth points for large excavating buckets, such as dragline buckets. The forward-extending nose of the adapter fits within the rear-facing socket of the tooth point. Ears extend back from the tooth point on both sides of the adapter and define apertures adapted to receive pins. A hole in the adapter is also adapted to receive the pins. The pins extend through the apertures and into the hole, thus fixedly connecting the tooth point to the adapter. To remove the tooth point, both pins can be driven into the adapter hole and housed there concurrently. The tooth point can then be removed and the pins later driven out of the hole. A lock system also connects a main body pin to a rigging part. The lock system is particularly suited to large rigging parts, such as for draglines. A pair of projections extend from the rigging part and define coaxial apertures and define holes normal to, and partially intersecting the apertures. The main body pin extends between the projections and into the apertures. A pair of locking pins extend through the holes and engage slots in the main body pin. A pair of keepers releasably engage each of the locking pins. Thus, the keepers retain the locking pins in position, and the locking pins in turn retain the main body pin in position.

19 Claims, 6 Drawing Sheets

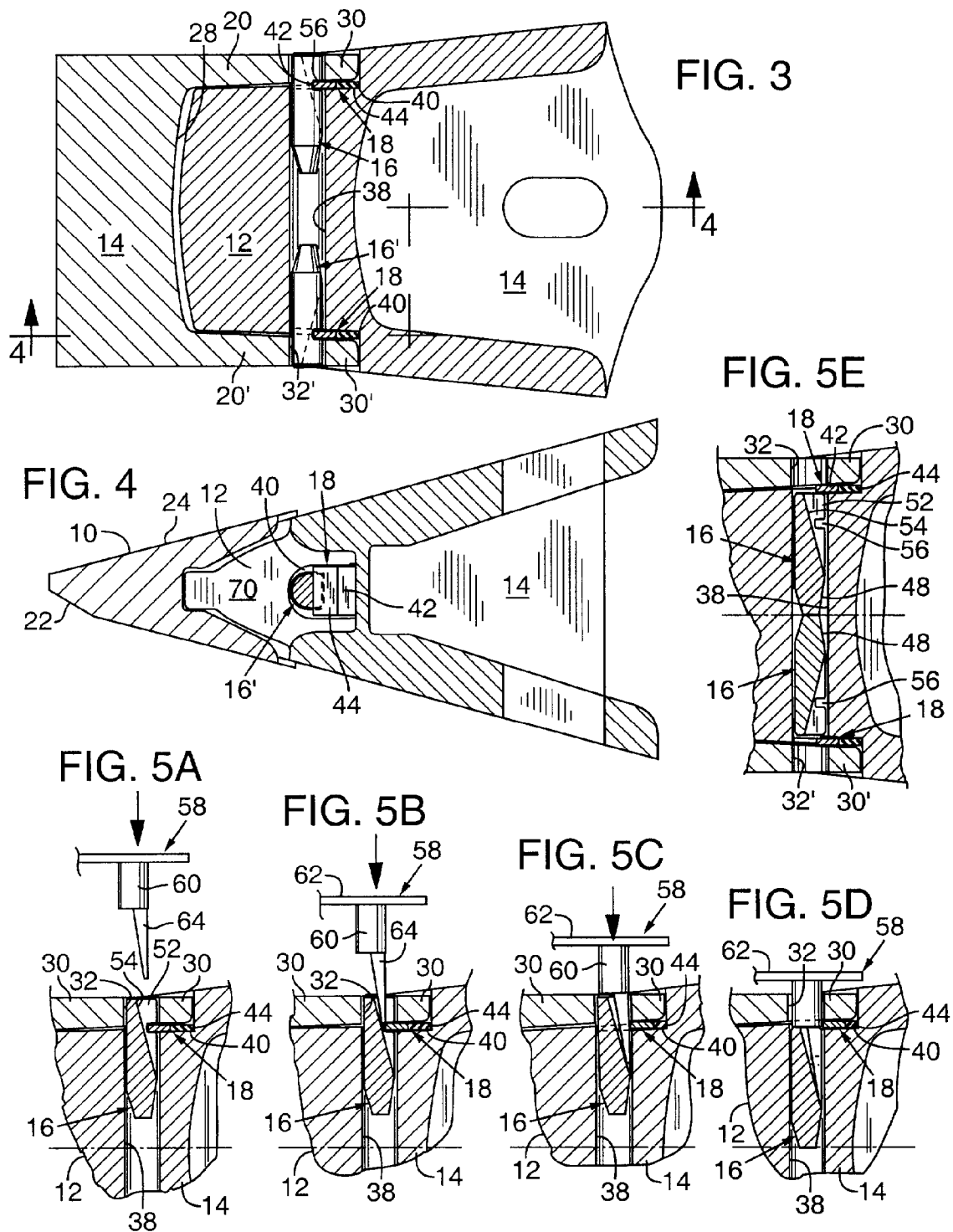

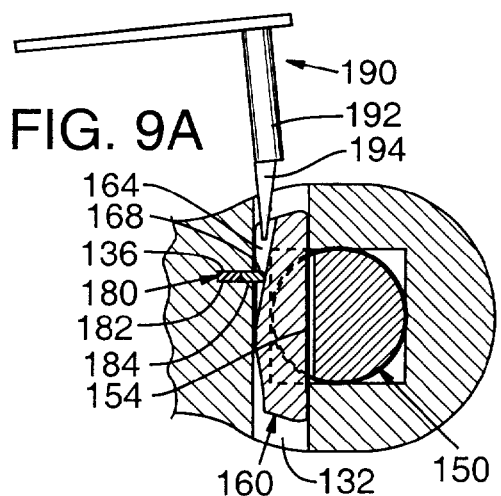
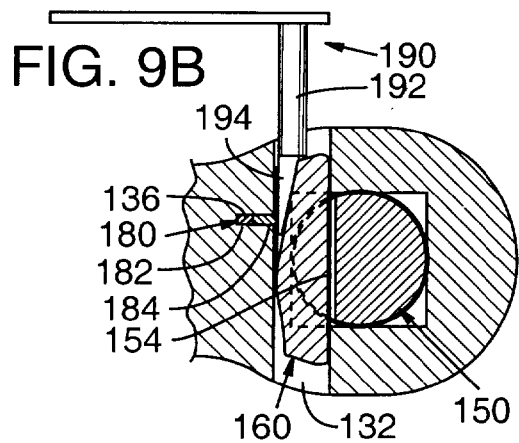
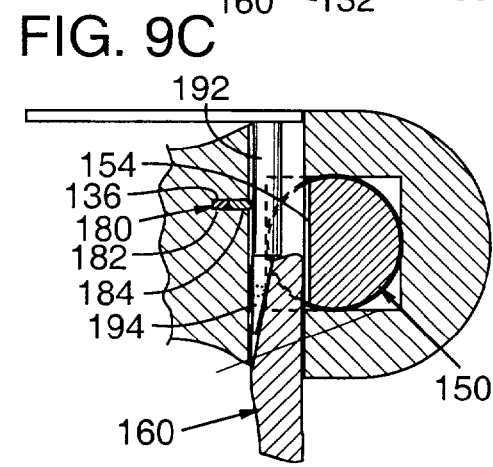
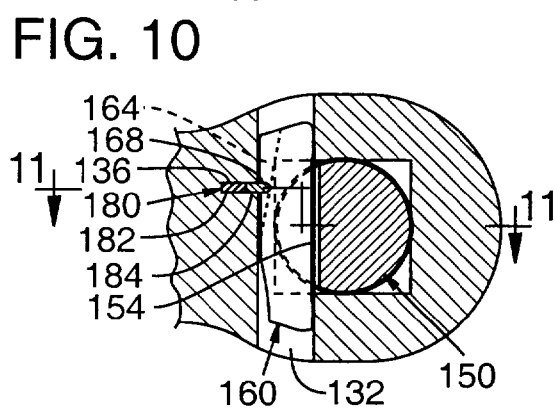
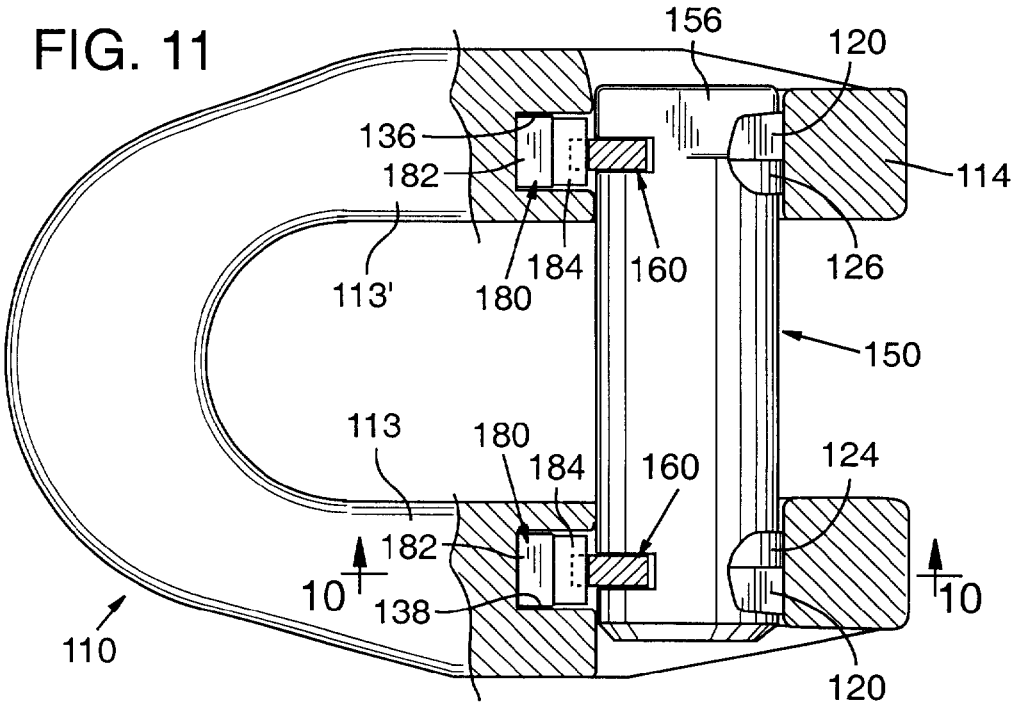

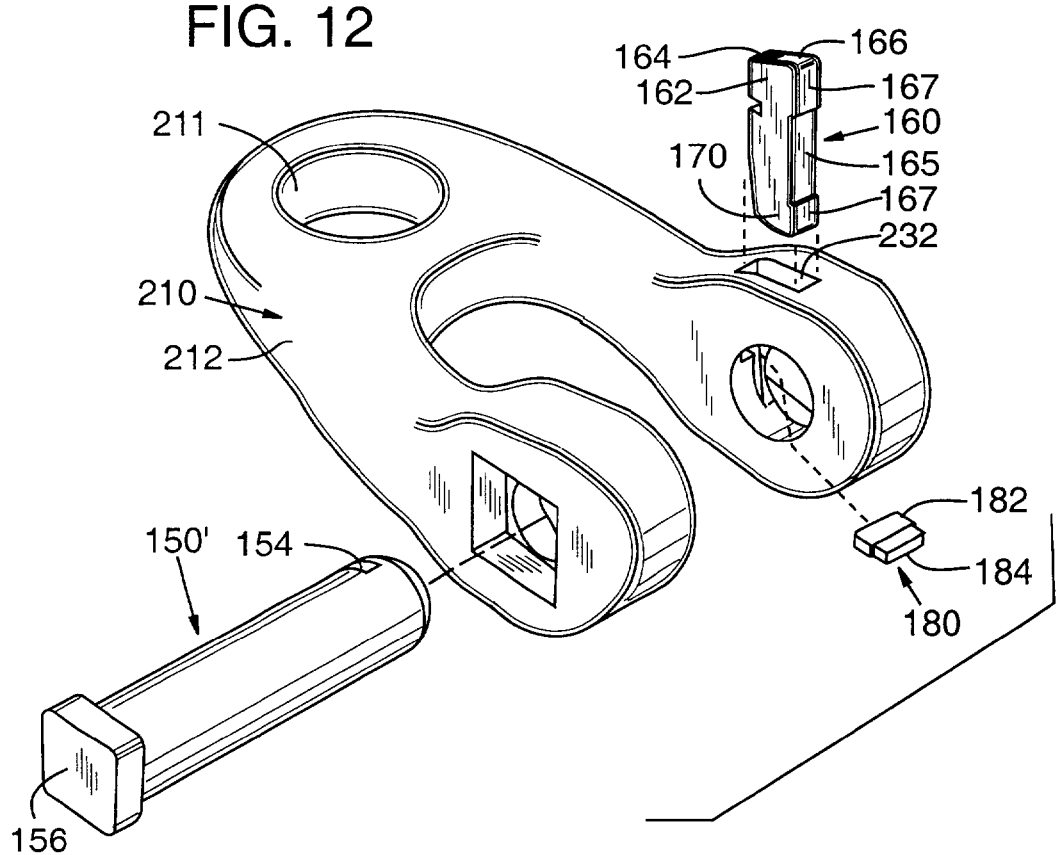

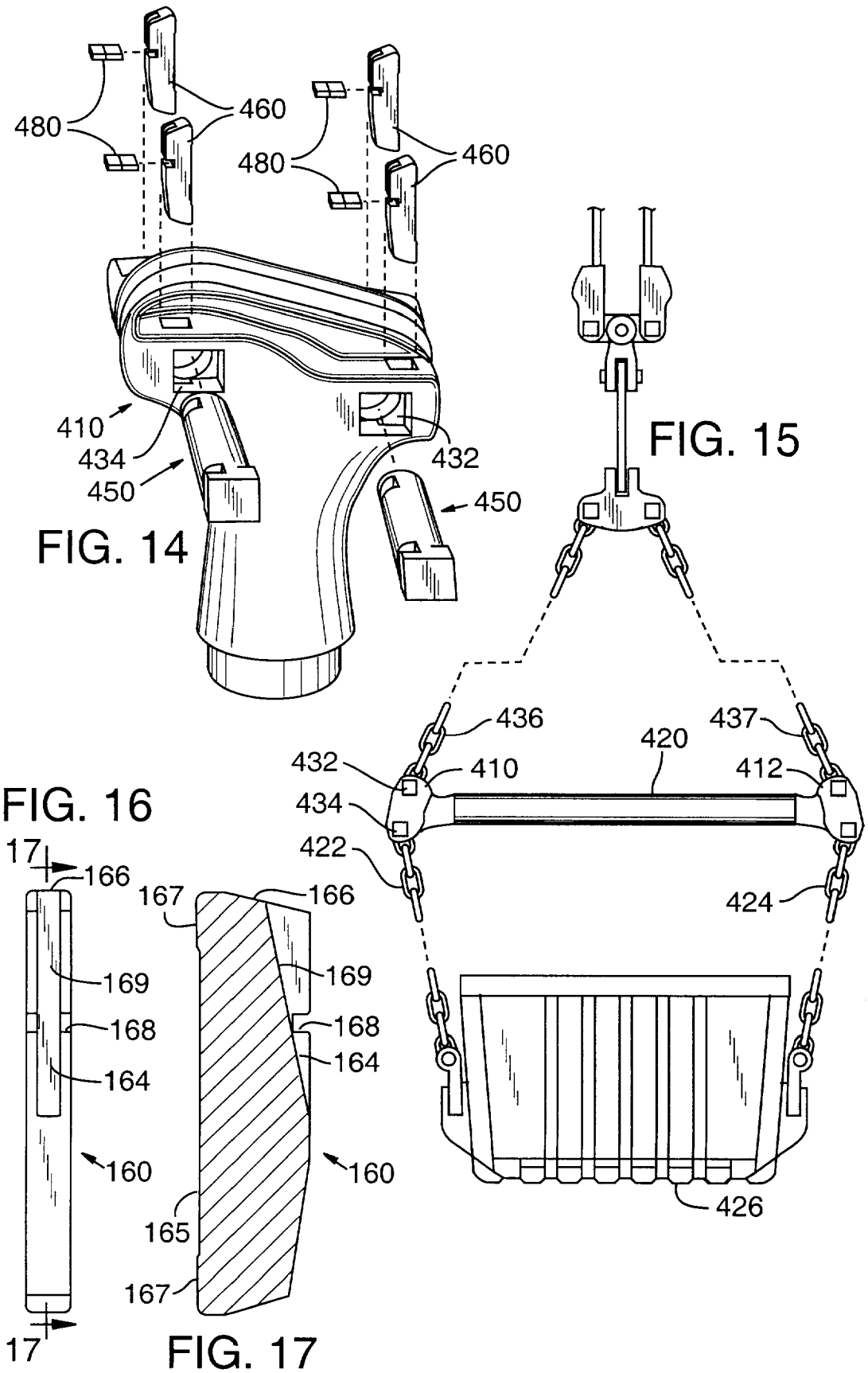

5,966,849

LOCK SYSTEM FOR EXCAVATING TOOTH POINT AND ADAPTER AND FOR RIGGING

This application is a continuation in part of prior application, Ser. No. 08/965,743, filed Nov. 7, 1997.

FIELD OF THE INVENTION

This invention relates to a locking arrangement for separable parts in heavy equipment such as a tooth point for an excavating bucket, and more particularly to a locking arrangement for the main body pin of various rigging parts.

BACKGROUND OF THE INVENTION

Removable tooth points have been used on excavating buckets and other earth moving equipment for many years. In that time several varying arrangements for retaining a tooth in place have emerged. Typically these designs attach tooth points to adapters, which in turn are attached to an excavating bucket or are otherwise secured to the earth moving device. The tooth points engage the earth to loosen it and allow the bucket to scoop it up for removal.

With large-scale excavating equipment, such as draglines, the tooth points of the bucket are subjected to substantial forces and frictional wear. Thus, tooth points wear down quickly, slowing excavation work because they cannot dig into the soil effectively, requiring greater force to do the same work and subjecting the entire excavating machine to greater stresses. In addition, without the loosening effect of the teeth, the bucket may suffer damage because of its engagement with unloosened material.

If the tooth points are replaced frequently, the excavating machine operates more efficiently. However, replacing tooth points can be a labor-intensive job, requiring costly down time for the excavating machine. Prior tooth point designs have attempted to reduce the amount of labor required to replace the points while still securely locking the tooth point to the adapter during operation. However, such designs have met with small degrees of success.

Some prior designs have used a locking pin extending vertically through the tooth point. However, in such designs, the heads of the pin are exposed to the main body of earth going into the bucket and to the earth below so that rocks often hit the heads of the pin causing deformation and dirt wedges between the pin and the receiving hole. Consequently, the pin is difficult to remove and much time is required to replace such tooth points.

Other designs have used pins that enter horizontally. However, such pins are generally difficult to replace because of the small space between teeth. Some designs have tried to remedy the problem by using two pins in the design. However, such designs still require the user to pound both pins through the width of the tooth point before removing the tooth. This is difficult because of the limited space between the teeth of the bucket.

Main body pins in large rigging parts have also been difficult to remove. A typical rigging part, such as a clevis pin must be easily removable and must be able to withstand the wear and tear associated with such parts. Past clevis parts have typically consisted of an "U"-shaped eye portion, hubs located at the end of each upright leg of the "U", and a main body pin extending between the hubs. Typically these main body pins have been secured either by a spool and wedge configuration or by welding a plate over the head of the pin. In the spool and wedge configuration, a pin is driven into a hole in the main body pin and is held in place by a compression fit. The main body pin is difficult to remove with either of these configurations. The compression-fit pins in the spool and wedge configuration have been so difficult to drive out that users have often resorted to cutting the main body pin out with a torch. The welded plate configuration also requires a torch or grinder to cut the plate off and allow the main body pin to be removed. In either case, the pins are very difficult to secure and release from the eye portion of the clevis. Similar problems have occurred with main body pins in other rigging parts such as shackles and pick-up links.

BRIEF SUMMARY OF THE INVENTION

An object of the present invention is to provide a novel lock system for an excavating bucket tooth point which securely fastens the tooth point to the adapter, but allows the tooth point easily to be replaced.

More specifically, an object of the invention is to provide a system which includes a tooth point having a socket to receive the end of the adapter and apertures in the opposite side walls of this point adapted each to receive one of a pair of short locking pins which extend into a pin receiving hole which extends through the adapter, and in which hole both pins can be wholly received. The locking pins are adapted to receive releasable locks or keepers to maintain them in locking position but which permit the locking pins to be driven into the hole in the adapter and out of engagement with the tooth point, and in which hole they are housed while the tooth point is removed. Unlocking of the pins is facilitated by unique cooperative construction of the pins and a removal tool.

Another object of the present invention is to provide a novel lock system for securing the main body pins of various rigging parts which allows the main body pins to be easily removed.

More specifically, an object of the present invention is to provide an improved lock system to releasably retain a main body pin which extends between a pair of projections and into coaxial apertures defined within the projections. The main body pin is adapted to receive locking pins to maintain the main body pin in position. In turn, the locking pins are adapted to receive releasable locks or keepers which retain them in locking position but permit the locking pins to be driven out of engagement with the main body pin, allowing the main body pin to be driven out of the apertures.

DESCRIPTION OF THE DRAWINGS

FIG. 3 is an enlarged sectional view taken along line 3—3 of FIG. 1.

FIG. 4 is a sectional view taken line 4—4 of FIG. 3.

FIG. 5A is a fragmentary sectional view taken along 3—3 of FIG. 4 showing the position of a pin in locking position and of the removal tool before being inserted to disengage a keeper and allow removal of the pin.

FIG. 5B is a view similar to FIG. 5A, but showing the removal tool contacting the keeper.

FIG. 5C is a view similar to FIG. 5A, but showing the removal tool compressing the keeper to disengage it from the pin.

FIG. 5D is a view similar to FIG. 5A, but showing the position of the removal tool after it has driven the pin into the adapter hole and out of a tooth point ear.

FIG. 5E is a view taken along line 3—3 of FIG. 4, showing both pins housed within the adapter hole.

FIG. 9A is an enlarged fragmentary sectional view taken along line 9—9 of FIG. 8 showing a locking pin in locking position and of the removal tool before being inserted to disengage a keeper and allow removal of the pin.

FIG. 9B is a view similar to FIG. 9A, but showing the removal tool compressing the keeper to disengage it from the pin.

FIG. 9C is a view similar to FIG. 9A, but showing the position of the removal tool after it has driven the locking pin partially out of the hole in the projection.

FIG. 10 is a fragmentary sectional view taken along line 10—10 of FIG. 11 with the pin in locking position.

FIG. 11 is a fragmentary sectional view of the clevis of FIG. 8 taken along line 11—11 of FIG. 10.

FIG. 12 is an exploded perspective view of an embodiment of the invention incorporated into a shackle.

FIG. 14 is a perspective view of a dragline bucket having a spreader bar.

FIG. 15 is an exploded perspective view of an embodiment of the invention incorporated into a spreader bar end.

FIG. 16. is a elevational view of a locking pin showing the wedge receiving slot and keeper engaging slot; and FIG. 17. is a sectional view thereof taken along line 17—17 of FIG. 16.

DESCRIPTION OF PREFERRED EMBODIMENT

Figure 1:
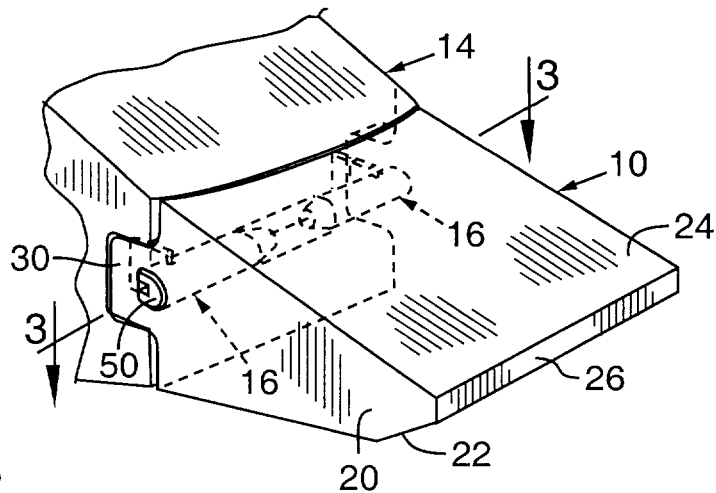
FIG. 1 is a perspective view of a preferred embodiment of the inventive lock system.
Figure 2:
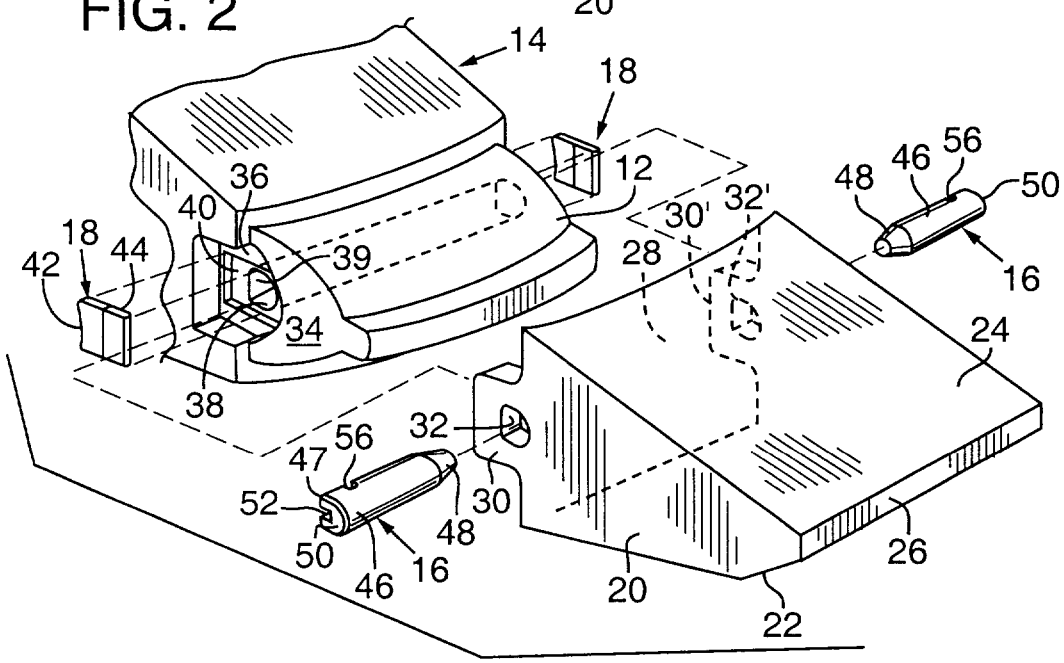
FIG. 2 is an exploded perspective view of the embodiment of FIG. 1.

FIGS. 1–2 illustrate a preferred embodiment of the present invention comprising a tooth point or earth-engaging member 10 mounted to the nose 12 of an adapter or driving member 14. The tooth point 10 is removably secured to the adapter nose 12 by the horizontally-extending locking pins 16 held in place by locks or keepers 18. As will be understood, a plurality of adapters will be mounted at regular intervals on the forward edge of the bottom of an excavating shovel or like earth moving apparatus.

Referring now to FIG. 2, the tooth point 10 has opposite side walls 20, 20', a bottom wall 22 and a top wall 24. The top wall 24 and the bottom wall 22 meet to form an horizontal front cutting edge 26 and diverge rearwardly to form a rear-facing socket 28. The side walls 20, 20' comprise ears 30, 30' which define apertures 32, 32', respectively, adapted to receive the horizontally extending pins 16, which are preferably of non-circular cross-section in the illustrated embodiment being D-shaped in cross-section.

The forward end of the adapter 14 forms a nose 12 that is shaped to fit cooperatively in the socket 28 in the tooth point 10. The nose 12 is inwardly offset on all sides from the general exterior surfaces of the adapter 14. The upper and lower surfaces of the nose 12 converge forwardly, ending in a full width, forwardly-extending horizontal projection. The side faces 34 of the nose 12 also converge forwardly and are formed with recesses 36 on each side of the adapter 14 near the rearward ends of the faces 34. The recesses 36 are adapted to receive the ears 30, 30' of the tooth point 10 when the latter is mounted upon the adapter 14 (see FIG. 1).

Referring still to FIG. 2, a hole 38, centrally located within the recesses 36 and also preferably D-shaped in cross-section and adapted cooperatively to receive the pins 16, extends horizontally through the adapter 14, such that it is coaxial with the apertures 32 in the ears 30 when the nose 12 fits within the socket 28. The hole 38 is formed with a flat side 39 on the rearward side of the hole 38 (see FIG. 2). Channels or seats 40 in the surface of the recesses 36, adapted to receive locks or keepers 18, extend rearwardly from the hole 38.

Figure 6:
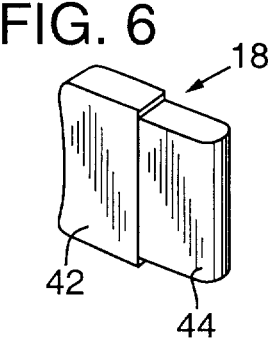
FIG. 6 is an enlarged perspective view of the lock or keeper used in a preferred embodiment of the inventive lock system.
Figure 7:
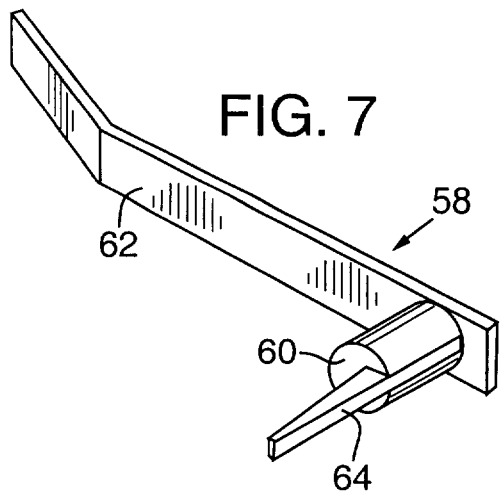
FIG. 7 is an enlarged perspective view of the removal tool used to disengage the lock or keeper from the locking pin.

The pins 16 and hole 38 are sized so that the pins fit snugly, but not tightly within the hole 38. The keepers 18 have a resilient portion 42 formed of a suitable elastomer and a dowel or rigid portion 44 formed preferably of steel (see FIG. 6). The resilient portion 42 of the keepers 18 is seated rearwardly within the channel 40, adjacent the ear 30 of the tooth point 10. The dowels 44 extend forwardly, partially into the hole 38 (best seen in FIG. 4).

Each pin 16 has a body 46, preferably, as stated, having a D-shaped cross section defining a flat side 47, a tip 48 sloping inward to form a truncated cone, and a head 50. The pins 16 are preferably of equal length and the combined length of the pins is no greater than the length of the hole 38. A wedge-shaped removal slot or wedge receiving slot 52 extends axially along the flat side 47 of the body 46 of the pin 16 (see FIG. 5A). The wedge receiving slot 52 has a bottom surface 54 that slopes at a small acute angle of about 12° from substantially the axis of the pin 16 at the head 50 to the outer surface of the pin. A lock slot 56, adapted to receive the dowel 44, extends perpendicular to the pin axis on both sides of the wedge receiving slot 52.

Turning now to FIG. 3, in the mounted position of the point, the pins 16 extend through the apertures 32 in the ears 30 and into the hole 38. The keepers 18, disposed within the seats 40 and held in place by the ears 30, extend into the lock slots 56 of the pins 16. Thus, the keepers 18 hold the pins 16 in place and the pins 16 fixedly connect the tooth point 10 to the adapter 14. As will be apparent, the cooperating D-shape of the hole 38 and pins 16 aligns the slots 56 of the pins to receive the keepers 18.

A removal tool 58 has a D-shaped head 60 complimentary to the body 46 of the pins 16, a handle 62 extending radially from one end of the head 60 and a wedge 64 extending axially from the opposite end of the head 60. The wedge 64 is adapted to fit within the wedge receiving slots 52 in the pins 16, but is preferably of slightly lesser width than the slots 52 so that it may slide freely into a slot. The head 60 preferably has an axial length slightly greater than the thickness of the tooth point ears 30.

Referring back to FIG. 2, in assembling a tooth point 10 on an adapter 14, the keepers 18 are first inserted into the seats 40. The tooth point 10 is then mounted on the adapter nose 12. Each pin 16 is inserted into the respective aperture 32 in the ears 30, with the pin aligned so that the lock slot 56 is facing the keeper 18. The pin 16 is then driven with a small hammer through the aperture 32 and into the hole 38. As the pin 16 is driven, the tip 48 compresses the resilient portion 42 of the keeper 18, allowing the pin 16 to pass into the hole 38. When the lock slot 56 reaches the keeper 18, the keeper 18 springs into the lock slot 56, holding the pin 16 in place (see FIG. 3).

Disassembly is illustrated in FIGS. 5A–E. The removal tool 58 is rotated such that head 60 is coaxial with the pin 16 and the wedge 64 is aligned with the wedge receiving slot 52 (see FIG. 5A). The wedge 64 is inserted into the wedge receiving slot 52 until the edge of the wedge contacts the keeper 18 (see FIG. 5B). The removal tool 58 is then driven inwardly by striking the removal tool with a small hammer, such as, for example, a two pound ball peen hammer, forcing the wedge 64 into the wedge receiving slot 52 until the head 60 contacts the pin 16 and the wedge 64 simultaneously compresses the resilient portion of the keeper 18, disengaging it from the lock slot 56 (see FIG. 5C). The removal tool 58 is then further driven, forcing the pin 16 out of the aperture 32 in the ear 30 and into the hole 38 in the adapter 14 (see FIG. 5D). The removal tool 58 is then withdrawn and the process is repeated for the other pin 16.

The keepers 18 then hold both pins 16 within the hole 38, as shown in FIG. 5E. With both pins 16 housed in the hole 38 so they don't engage the ears 30, the tooth point 10 is removed. The keepers 18 are then removed and the pins 16 are easily driven out since their diameter is smaller than the diameter of the hole 38. A two pound hammer is sufficient to drive the removal tool 58, forcing the pins 16 into the hole 38 and to drive the pins 16 out of the hole after the tooth point 10 is removed.

Since the pins 16 are arranged horizontally, damage to the heads 50 of the pins 16 is minimized, making it easier to drive the pins into the hole 38 for disassembly. Further, the pins 16 can both be housed within the hole 38 at the same time, allowing the tooth point 10 to be removed before driving the pins 16 through the length of the hole 38. Thus, the tooth point 10 is securely locked to the adapter 14 and is easily removed with minimal space required between teeth.

Figure 8:
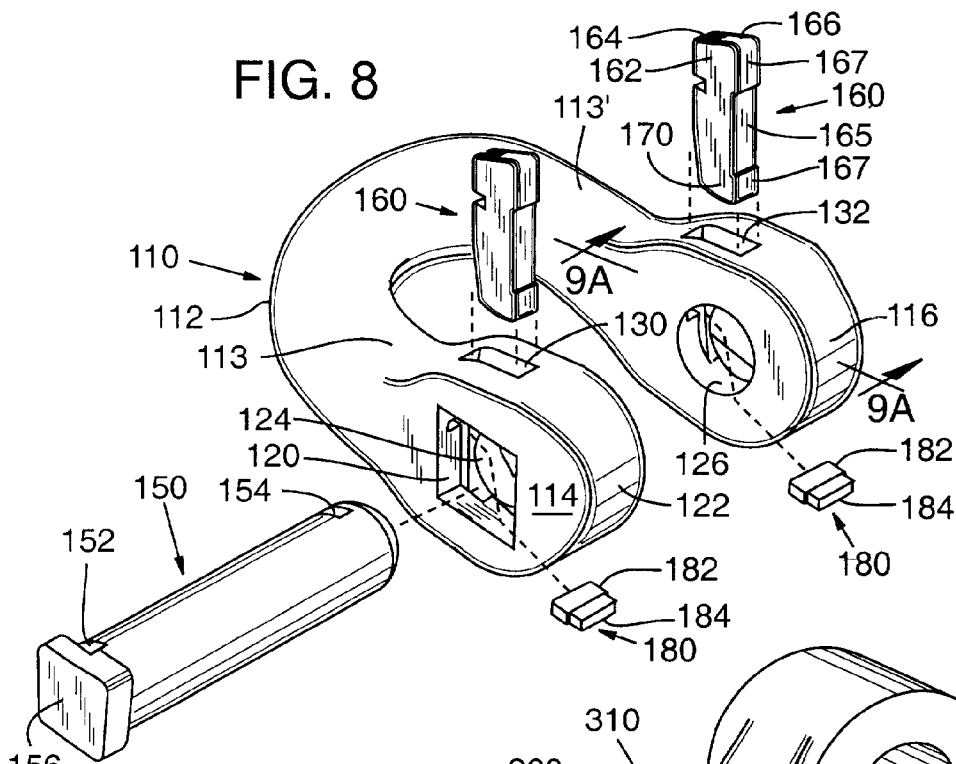
FIG. 8 is an exploded perspective view of an embodiment of the invention incorporated into a clevis.

In another embodiment of the invention the locking system retains a main body pin in position extending between two opposing projections on a rigging part, such as, for example, a clevis, shackle, pickup-link or the end of a spreader bar for a dragline bucket. Referring now to FIG. 8, the locking system is illustrated incorporated into a "U"-shaped clevis 110 comprising an eye or eye portion 112 forming the base and projections or upright legs 113, 113'. A hub portion, or hub 114, 116 is formed at the end of the legs 113, 113' respectively. In a preferred embodiment, a non-circular recess 120 extends partially into the outer facing side 122 of at least one hub 114, but such a recess is in each of the hubs 114, 116. Each of the hubs 114, 116 defines a centrally located aperture 124, 126, respectively. Preferably, the apertures 124, 126 are coaxial, and are centrally located with respect to the recesses 120. Each hub portion 114, 116 also has a hole 130, 132 extending through it that is substantially normal to the apertures 124, 126. Preferably, the holes 130, 132 are of a non-circular cross section, preferably being rectangular. Each hole 130, 132 at least partially intersects the corresponding aperture 124, 126 and preferably, each hole 130, 132 passes to the side of the center of the corresponding aperture 124, 126. On the same side of each aperture 124, 126 as the corresponding hole 130, 132, a pocket recess, or notch 136, 138 extends from the holes 130, 132 into the hub 114, 116 (seen best in FIGS. 10–11).

A main body pin 150 is adapted to extend between the two hub portions 114, 116 of the clevis 110 and into the apertures 124, 126. Preferably, the main body pin 150 has a pair of slots 152, 154 that align with the holes 130, 132. In a preferred embodiment the main body pin 150 also has a non-circular head 156 that cooperatively fits into the recess 120 in the hub 114 or the hub 116 so as to orient the main body pin 150 such that the slots 152, 154 align with the holes 130, 132.

Locking pins 160 are adapted to fit within the holes 130, 132 in the hub portions 114, 116, respectively, and to engage the slots 152, 154 respectively, in the main body pin 150. Each locking pin 160 has a body 162 with a cross section complementary to the holes 130, 132, in the illustrated embodiment being rectangular.

A wedge-shaped removal slot or wedge receiving slot 164 extends longitudinally along the body 162 of a locking pin 160 as shown in FIG. 16. The bottom of the wedge receiving slot 164 slopes at a small acute angle to the axis of the locking pin 160 (see FIG. 9A) from the head 166 to the outer surface of the locking pin 160 at a point below the notch 136 or 138 when the locking pin is installed in locking position. A transverse lock slot 168 in the pin 160 extends on both sides of the removal slot 164, but its depth is no greater than at the intersection of the lock slot 168 with the bottom surface 169 of the removal slot 164 (see FIG. 17). The purpose of this will be described hereinafter. The body 162 of the locking pin 160 slopes inwardly on the same side of the locking pin as the lock slot 168 and the removal slot 164 at a small acute angle starting just below the slots, and then at a large acute angle near the tip 170 of the pin, until it intersects the opposing side of the locking pin 160, at the tip 170 of the locking pin 160. This construction facilitates insertion of the locking pins 160 into the slots 130, 132. When the locking pins 160 are in locking position, each extending through the holes 130, 132 and engaging the slots 152, 154, they retain the main body pin 150 in position (see FIG. 11).

The locking pins 160 are releasably retained in locking position by a pair of keepers 180 each of which consists of a resilient portion 182 and a dowel or stiff portion 184, similarly to the keepers 18 described previously. The resilient portion 182 of a keeper is seated within a pocket recess 136 or 138 in the hub portions 114, 116. The dowel portions 184 extend into the hole 130 or 132 and engage the lock slots 168 in the locking pins 160. Thus, the keepers 180 retain the locking pins 160 in position and the locking pins in turn retain the main body pin 150 in position. Preferably the thickness and width of the dowel portions of a keeper is no greater than the thickness or width of the resilient portion so that the dowel will not present a lip to catch on the wall defining the keeper recess to resist or prevent disengagement of a keeper from the locking pin slot 168.

Still referring to FIG. 8, in assembling this embodiment of the locking system, the keepers 180 are first placed within the pocket recesses 136, 138 with the resilient portions positioned within the recesses and the dowels 184 extending into the holes 130, 132. The apertures 124, 126 provide access to the pocket recesses 136, 138. The main body pin 150 is then pushed through the first aperture 124 and into the second aperture 126, so that the slots 152, 154 align with the holes 130, 132. The locking pins 160 are then driven into the holes 130, 132 and slots 152, 154. As a locking pin 160 is driven into a hole 130 or 132, the sloped tip 170 of the locking pin 160 engages the protruding edge of the dowel and compresses the resilient portion 182 of the keeper 180, allowing the locking pin to slide into the hole. When the lock slot 168 on the locking pin being installed aligns with the keeper 180, the compressed resilient portion 182 of the keeper forces the dowel portion 184 into the lock slot 168. The dowel portion 184 then retains the engaged locking pin 160 in place (see FIG. 10). As a locking pin 160 is driven into the hole 130, it also engages in the slot 152 in the main body pin 150, thus retaining the main body pin 150 in position (see FIG. 11). The same is repeated for the other locking pin 160. Since the locking pins 160 engage in the slots 152, 154 in the main body pin, the latter will be prevented from axial movement and will be held within the clevis. As clearly illustrated in FIG. 17, the locking pins 160 are formed with a relief area 165 in the surface opposite the lock slot 168 to define, in effect, two wear pads 167 that engage the surface of the eye 114 or 116 when installed. The relief facilitates insertion and removal of a locking pin.

A removal tool 190 is provided which is similar to the removal tool 58 described above, and is provided with a head 192 and wedge 194. The head 192 of the removal tool 190 is of such a length as to be able to extend from the surface of a clevis eye past the keeper 189, as shown in FIG. 9C. The wedge 194 is sized to fit easily within the removal slot 164 of the locking pin 160. The head 192 is sized to fit easily within the holes 130, 132.

Disassembly is illustrated in FIGS. 9A–C. The removal tool 190 is rotated such that head 192 is aligned with the locking pin 160 and the wedge 194 is aligned with the wedge receiving slot 164 (see FIG. 9A). The wedge 194 is inserted into the wedge receiving slot 164 until the edge of the wedge contacts the dowel 184 of the keeper 180. As shown in FIG. 16, the depth of the lock slots positions the keeper extending therein such that the tip of the wedge 194 can slide behind the keeper as the wedge is inserted. The removal tool 190 is then driven inwardly by striking the removal tool 190 with a small hammer, such as, for example, a two pound ball peen hammer, forcing the wedge 194 into the wedge receiving slot 164 until the head 192 contacts the locking pin 160. As it is driven inwardly the wedge 194 simultaneously compresses the resilient portion 182 of the keeper 180, disengaging the dowel 184 from the lock slot 168 (see FIG. 9B). The removal tool 190 is then further driven, forcing the locking pin 160 out of the hole 130 or 132 (see FIG. 9C). The removal tool 190 is then withdrawn and the process is repeated for the other locking pin 160. With both locking pins 160 removed, the main body pin 150 may be easily driven out of the apertures 124, 126.

FIG. 12 illustrates another embodiment of the lock system. A shackle 210 is shaped similarly to the clevis 110. However, an aperture 211 extends through the base of the eye 212 substantially normal to the plane of the "U". The aperture 211 is adapted to receive a pin from another rigging part, such as another clevis or shackle, to secure the shackle 210 to that rigging part. The lock system is incorporated into the shackle 210, and operates in the same manner as was described above with reference to the clevis 110.

Alternatively, as shown in FIG. 12, the lock system may use only one locking pin 160 in environments where a single locking pin will be sufficient to assure retention in place of a main body pin 150'. The one locking pin embodiment or the two locking pin embodiment may be used for any rigging part that incorporates the inventive lock system, as will be appreciated by those skilled in the art. In many applications the embodiment with two locking pins is preferred because of the added safety and security provided by the additional locking pin. However, the embodiment having only one pin does not require the assembly and removal procedures to be repeated for an additional locking pin and the attendant added cost of manufacture.

Figure 13:
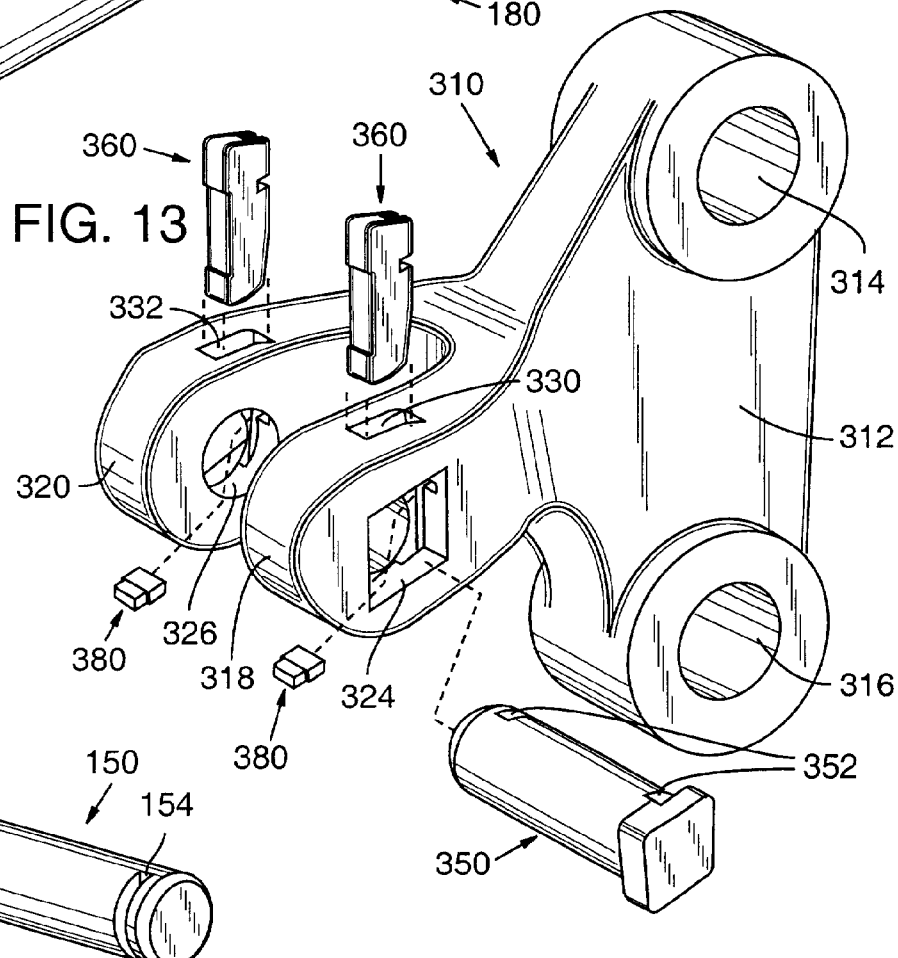
FIG. 13 is an exploded perspective view of an embodiment of the invention incorporated into a pick-up link.
Figure 8A:
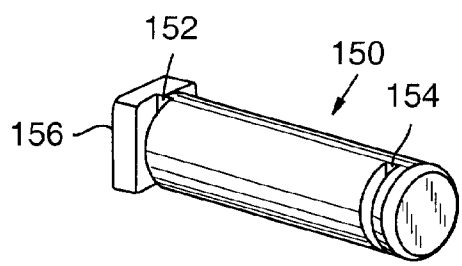
FIG. 8A is a perspective view of the main body pin of FIG. 8 showing the opposite side thereof.

In another embodiment shown in FIG. 13, the lock system is incorporated into a pick-up link 310. The pick-up link 310 is a three point rigging part with each of the three points being connected by a substantially triangular body member 312, having rounded corners. Two of the connection points are apertures 314, 316 extending normal to the plane of the body member 312 and located at two corners of the body member 312. The apertures 314, 316 are adapted to receive main body pins from other rigging parts. The final corner branches to form two legs, or projections 318, 320 which are substantially parallel to each other and to the body member 312. These projections operate in the manner of the upright legs and hubs 114, 116 of the clevis 110 described above.

A pair of coaxial apertures 324, 326, adapted to receive a main body pin 350 extend through each of the projections 318, 320 in a direction substantially normal to the body member 312. A pair of holes 330, 332, adapted to receive locking pins 360, extend through each of the projections 318, 320 parallel to the body member 312, and partially intersecting the respective apertures 314, 316. A pocket recess (not shown) adapted to receive a keeper 380 extends into each projection 318, 320, as described with reference to the clevis embodiment above. The main body pin 350 extends between the projections 318, 320 and into the apertures 324, 326, and is held in place by the locking pins 360 as described with reference to the clevis embodiment above. Assembly and removal of the main body pin 350 is as explained above for the clevis embodiment.

Another embodiment shown in FIG. 14 incorporates the lock system into spreader bar ends 410, 412. Referring to FIG. 15, the spreader bar 420 on a dragline assembly forces the lower hoist chains 422, 424 to slope outwardly from the bucket 426 (see FIG. 15). Each spreader bar end 410, 412 comprises a body 430 (see FIG. 14) attached to an end of the horizontal spreader bar 420, and two opposing clevis portions 432, 434. One clevis portion 434 opens downwardly to engage the lower hoist chain 422, 424, while the other clevis portion 432 opens upwardly to receive the upper hoist chain 436, 438.

Referring now to FIG. 14, a main body pin 450 extends between the opposing projections of each clevis portion 432, 434. The main body pins 450 are secured by a locking system that is constructed and operates in the same manner as described in the above embodiments.

Although the invention has been described with reference to specific embodiments, the invention includes modifications of those embodiments. For example, the invention may be incorporated into several other rigging parts as will be appreciated by those skilled in the art. We claim all modifications as come within the spirit and scope of the appended claims.

We claim:

1. A lock system for securing a main body pin between opposing projections extending from a rigging part, comprising:

a rigging part having a pair of opposing projections defining coaxial apertures, at least one of the projections further defining a hole substantially normal to, and at least partially intersecting, the aperture therein;

a main body pin extending between said projections and into said apertures;

said main body pin having an exterior surface and a transverse slot in said exterior surface, said transverse slot being in communication with said hole;

a locking pin extending into said hole in said one of the projections and releasably engaging in said transverse slot in said main body pin; and at least one keeper operatively arranged between said locking pin and the corresponding said one of the projections such that the keeper releasably engages said locking pin to retain said locking pin in a locking position in said transverse slot in said main body pin.

2. The lock system of claim 1 wherein said exterior surface of said main body pin defines an exposed coupling portion between said projections, said coupling portion being swivelingly coupleable to another rigging part.

3. The lock system of claim 1 including a pocket recess in said one of the projections adapted to receive said keeper.

4. The lock system of claim 3 wherein said keeper includes a stiff portion adapted to releasably engage said transverse slot in said locking pin and a resilient portion adapted to seat in said pocket recess in said one of the projections.

5. The lock system of claim 4 wherein said locking pin includes a removal slot in the surface thereof intersecting said transverse slot to allow insertion of a removal tool to disengage said keeper from said transverse locking pin slot.

6. The lock system of claim 5 further including a removal tool, said removal tool comprising:
   a wedge adapted to fit within said removal slot and disengage the keeper from said transverse slot,
   a head attached to said wedge adapted to contact an end of said locking pin when the wedge has effected disengagement of said keeper from said transverse slot for driving said locking pin through said hole, and
   a handle attached to said head for aligning and withdrawing the removal tool.

7. The lock system of claim 1, wherein the rigging part is a clevis, and said opposing projections are ends of a U-shaped eye portion of said clevis.

8. The lock system of claim 1, wherein the rigging part is a shackle, and said opposing projections are ends of a U-shaped portion of said shackle, said shackle having a web member connecting sides of the U-shaped portion to define an eyelet therein.

9. The lock system of claim 1, wherein the rigging part is a pick-up link, and said opposing projections are ends of a U-shaped portion of said pick-up link, the pick-up link having a linking portion extending from the U-shaped portion.

10. The lock system of claim 1, wherein the rigging part is a spreader bar end, and the main pin is a first main pin and the apertures are first apertures, the spreader bar end having a second main pin extending between said opposing projections and through second coaxial apertures defined in said opposing projections.

11. A lock system for a main body pin of a rigging part comprising:
    a first projection extending from the rigging part, having a first aperture extending therethrough and further having a first hole extending therethrough substantially normal to and at least partially intersecting the aperture;
    a main body pin extending into said aperture, said main body pin having a slot in the periphery thereof aligned with said first hole;
    a first locking pin extending through said first hole in the first projection and engaging within said slot in the main body pin to lock said main body pin within said first projection; and
    a keeper positioned in said first projection and releasably engaged between said first locking pin and said first projection to retain the first locking pin in engagement within said main body pin slot and adapted to be disengaged from said first locking pin to allow the first locking pin to be driven out of engagement with the main body pin.

12. The lock system of claim 11 wherein a second projection extends from the rigging part and defines a second aperture and said main body pin extends between the first and second projections and into said second aperture in the second projection.

13. The lock system of claim 12 wherein a second hole extends through said second projection at least partially intersecting said second aperture in said second projection, the main body pin has a second slot aligned with the second hole, a second locking pin extends into the second hole and engages said second slot in the main body pin and a second keeper releasably engages said second locking pin, such that the main body pin is releasably secured between said first and second projections by said locking pins.

14. The lock system of claim 13 wherein said locking pins each includes a transverse lock slot adapted to receive a keeper and a removal slot in the surface thereof intersecting said transverse lock slot adapted to allow a removal tool to disengage a said keeper.

15. A lock system for securing a main body pin between opposing projections extending from a rigging part comprising:
    a pair of opposing projections extending from said rigging part defining a pair of coaxial apertures, and a pair of holes, one in each of said projections, substantially normal to and at least partially intersecting the aperture therein;
    a main body pin extending between said projections and into said apertures and having transverse slots in its periphery aligned with said holes in said projections;
    a pair of locking pins extending one through each of said holes in the projections, and engaging in locking positions one in each of said transverse slots in the main body pin, thus retaining the main body pin in position, each of said locking pins having a lock slot therein; and
    a pair of keepers operatively arranged between said locking pins and said projections, respectively, said keepers releasably engaging said locking pins to retain said locking pins in locking positions in said transverse slots in said main body pin.

16. The lock system of claim 15, wherein said exterior surface of said main body pin defines an exposed coupling portion between said projections, said coupling portion being swivelingly coupleable to another rigging part.

17. The lock system of claim 15 comprising a removal slot in each of said holes to receive a tool to disengage one of the keepers from the respective lock slot.

18. The lock system of claim 17 further including a removal tool with a wedge adapted to fit within said removal slot and engage the associated keeper to disengage the keeper from the locking pin as the wedge is driven into said slot, thereby allowing the locking pin to be driven out of the hole while the keeper is disengaged from the locking pin.

19. The lock system of claim 15, a pair of pocket recesses one in each of said projections communicating with the hole in the respective projection, wherein the keepers each have a resilient portion and a dowel portion, the keepers being seated one within each of said projections, said resilient portions being seated in said recess in the respective projection and said dowel portion being seated in said lock slot in the locking pin seated in said projection, whereby the main body pin may be removed by disengaging said keepers from said locking pins, driving said locking pins out of engagement with said main body pin, and then driving said main body pin out of said apertures.

* * * * *

UNITED STATES PATENT AND TRADEMARK OFFICE
CERTIFICATE OF CORRECTION

PATENT NO. : 5,966,849
DATED : October 19, 1999
INVENTOR(S) : Michael D. Moehnke and Bruce C. Johnson It is certified that error appears in the above-indentified patent and that said Letters Patent is hereby corrected as shown below:

Title page, item [54] and col. 1,
In title after "Rigging" insert --Parts--

Signed and Sealed this

Twentieth Day of March, 2001

Attest:

NICHOLAS P. GODICI

Attesting Officer

Acting Director of the United States Patent and Trademark Office